United States Patent [19]

Sakaguchi et al.

[11] Patent Number: 5,104,633

[45] Date of Patent: Apr. 14, 1992

[54] METHOD FOR PRODUCING HIGH-PURITY METALLIC SILICON AND APPARATUS THEREFOR

[76] Inventors: Yasuhiko Sakaguchi; Fukuo Aratani; Kazuhiro Uchino, all of Chiba; Mitsugi Yoshiyagawa, Osaka; Kunio Miyata, Osaka; Masato Ishizaki, Osaka; Tetsuro Kawahara, Osaka, all of Japan

[21] Appl. No.: 455,313

[22] PCT Filed: Feb. 19, 1988

[86] PCT No.: PCT/JP88/00173

§ 371 Date: Dec. 18, 1989

§ 102(e) Date: Dec. 18, 1989

[87] PCT Pub. No.: WO89/07578

PCT Pub. Date: Aug. 24, 1989

[51] Int. Cl.[5] .............................................. C01B 33/02
[52] U.S. Cl. .................................... 423/350; 423/349
[58] Field of Search ....................... 423/348, 349, 350; 422/202, 204

[56] References Cited

U.S. PATENT DOCUMENTS

| | | | |
|---|---|---|---|
| 3,010,797 | 11/1961 | Aries | 423/350 |
| 3,660,298 | 5/1972 | McClincy et al. | 423/350 |
| 4,457,902 | 7/1984 | Watson | 423/350 |

FOREIGN PATENT DOCUMENTS 0208567 of 0000 European Pat. Off. .

OTHER PUBLICATIONS

Japanese, vol. 10, No. 123(C-344) (2180), May 8, 1986-- Process and Device for Preparing Silicon.

*Primary Examiner*—Olik Chaudhuri
*Assistant Examiner*—Ken Horton
*Attorney, Agent, or Firm*—Dvorak and Traub

[57] ABSTRACT

A method and apparatus for producing or manufacturing a high purity metallic silicon takes a process for generating silicon monoxide by causing reaction between a silicon dioxide containing material and molten state metallic silicon. The silicon monoxide thus generated is sucked for reduction by means of a reducing agent including a carbon containing material and a silicon containing material.

18 Claims, 2 Drawing Sheets

METHOD FOR PRODUCING HIGH-PURITY METALLIC SILICON AND APPARATUS THEREFOR

FIELD OF THE INVENTION

The present invention relates generally to a method and apparatus for producing high-purity metallic silicon which can be used for a solar cell, for example. More specifically, the invention relates to a method and apparatus for producing a metallic silicon having a purity higher than or equal to 99.999%, efficiently and economically.

DESCRIPTION OF THE BACKGROUND ART

It is conventional that the metallic silicon or ferrosilicon is provided by reduction of silica (silicon dioxide) in the aid of coke and/or coal utilizing arc furnace. In the reduction process, not only the metallic silicon but also impurity components, such as iron, titanium, aluminum and so forth, are reduced. By the presence of such impurity components to be reduced with the metallic silicon, the purity of the metallic silicon to be produced has been limited at about 98% to 99%.

In the recent years, there has been an increasing demand for metallic silicon of substantially high-purity, e.g. higher than or equal to 99.999%. Such high-purity metallic silicon has numerous application, such as for solar cells. In order to respond to such a demand, a process has been developed and proposed. Such a proposed process utilizes refined natural silica as the source of silicon dioxide. This refined natural silica is generally powdered or granular with a grain size of less than several millimeters. Therefore, in order to use this refined silica, an extra process step was needed to sufficiently increase the grain size of the silica since such small grain size silica could not be used for such reducing process otherwise.

For example, the Japanese Patent First (unexamined) Publication (Tokkai) Showa 57-111223 proposes a method for reducing the refined natural silica. The process proposed in the Tokkai Showa 57-111223 employs a process step for preparing material silica block of 3–12 mm in diameter. This clearly increase ineconomically the process steps in the production of the high-purity silicon. In addition, during the preparation of the material silica blocks, an impurity tends to be contained in the block for causing lowering of the purity of the material silica.

Another improvement has been proposed in the Japanese Patent First Publication (Tokkai) Showa 58-69713. In the disclosed process, the reaction between silica and carbon takes place in a high-temperature plasma jet which transports the resultant product onto a carbon layer. In this proposed process, a large amount of silicon carbide is created as a result of reaction with the carbon layer. The created silicon carbide tends to accumulate within the carbon layer and fill interstices between the carbon grains, which inhibits further reaction.

A further proposal has been disclosed in the European Patent First (unexamined) Publication No. 02 08 567. The disclosed method and apparatus perform a production of high-purity metallic silicon by subjecting a stream of oxides of silicon, (e.g. in an aerosol) to reaction heat in the presence of a mixture of oxides of silicon and a material of the group including carbon and metallic carbide. The silicon monoxide produced by the reaction is scavenged from exhaust gas leaving the reaction chamber, re-condensed, and returned to reaction chamber. Such prior proposed method requires scavenging of the silicon monoxide containing exhaust gas to be recirculated into the reaction chamber for obtaining satisfactorily high yield.

The process disclosed in the European Patent First Publication No. 02 08 567 is established based on that the metallic silicon is produced generally through the chemical reaction caused during the production process:

$$SiO_2 + 2C \rightarrow Si + 2CO \ldots \quad (1)$$

In practice, combination of reactions will occur during the metallic silicon production process, which reactions can be illustrated by:

$$SiO_2 + C \rightarrow SiO + CO \ldots \quad (2)$$

$$SiO_2 + 3C \rightarrow SiC + 2CO \ldots \quad (3)$$
$$2SiO_2 + SiC \rightarrow 3SiO + CO \ldots \quad (4)$$

$$SiO_2 + Si \rightarrow 2SiO \ldots \quad (5)$$

$$SiO + 2C \rightarrow SiC + CO \ldots \quad (6)$$

$$SiO + C \rightarrow Si + CO \ldots \quad (7)$$

$$SiO + SiC \rightarrow 2\,Si + CO \ldots \quad (8)$$

When a powder state silica is introduced into an electric furnace, in, which the aforementioned combination of reactions is occurring, large volume of silicon monoxide SiO is produced through the reaction of the formula (2) since the powder state silica has better reaction ability than that of block form silica. Part of the silicon monoxide tends to be blown away from the furnace with the exhaust gas.

Therefore, the foregoing European Patent First Publication No. 02 08 567 discloses a process including injecting the silica through the bottom of the furnace to induce reactions of formulae (2) and (4) at around arcing region to generate silicon monoxide. The silicon monoxide thus generated reacts with carbon or silicon carbide charged through the top of furnace at a reaction temperature about 1800° C. or higher to induce reactions of the formulae (6) and (8) to generate the metallic silicon and silicon carbide. As will be appreciated, the reactions of formulae (2) and (4) are reactions for producing silicon monoxide and carbon monoxide and the reactions of formulae (6) and (8) are reactions for producing carbon monoxide with consumption of the silicon monoxide. In thermodynamical analysis, it was found that the ratio of silicon monoxide versus carbon monoxide in the reactions of formulae (2) and (4) was in a range of 1.67 to 2.48 in the equilibrium state whereas the ratio in the reaction of formulaa of (6) and (8) was in a range of 0.45 to 0.95. Therefore, in the process including recirculation of silicon monoxide, only about 20 to 50% of silicon monoxide can be used for the production of the metallic silicon. It is also recognized that the reduction of the ratio of silicon monoxide versus carbon monoxide in the reactions of the formulae (6) and (8) is caused by dilution of gaseous state silicon monoxide with carbon monoxide gas as by-product.

Therefore, as will be appreciated from the foregoing discussion, the process proposed in the European Patent First Publication No. 02 08 567 is not yet satisfactory in viewpoint of production yield.

SUMMARY OF THE INVENTION

Therefore, it is an object of the present invention to provide a novel and highly efficient process in production of high-purity metallic silicon and apparatus therefor.

Another object of the invention is to provide a process and a method which can utilize substantially small grain size material silica without requiring a facility for scavenging the exhaust gas created in the reaction chamber.

In order to accomplish the aforementioned and other objects, a method and apparatus for producing or manufacturing a high-purity metallic silicon, according to the present invention takes a process for generating silicon monoxide by causing reaction between a silicon dioxide containing material and molten metallic silicon. The silicon monoxide thus generated is sucked for reduction by means of a reducing agent including a carbon containing material and a silicon containing material. These process provides high production yield and material efficiency and can be performed in simple and less-expensive construction in facility.

According to one aspect of the invention, a process for producing a high-purity metallic silicon comprises the steps of:

injecting silicon dioxide containing material toward metallic silicon under a predetermined first reaction temperature for causing reaction to generate gaseous state silicon monoxide;

contacting generated gaseous state silicon monoxide to a reducing agent which is composed of a carbon containing material and a silicon containing material, for reducing the silicon monoxide to obtain metallic silicon under a predetermined second reaction temperature; and collecting metallic silicon reduced from the silicon monoxide.

According to another aspect of the invention, a process for producing high-purity metallic silicon comprises the steps of:

defining first and second sections in a shaft furnace, which first section is oriented at lower elevation in relation to the second section and adapted to accumulate the metallic silicon and which second section is filled with a reducing agent containing a carbon containing material and a silicon containing material;

adjusting temperature in the first section at a first predetermined temperature;

adjusting temperature in the second section at a second predetermined temperature;

injecting silicon dioxide containing material into the first section for causing a reaction between the silicon dioxide and the metallic silicon to generate gaseous state silicon monoxide;

introducing the gaseous state silicon monoxide into the second section for contacting the silicon monoxide to the reducing agent for reducing the silicon monoxide to obtain metallic silicon; and collecting metallic silicon in the first section.

According to a further aspect of the invention, an apparatus for producing a high-purity metallic silicon comprises first means for accumulating molten metallic silicon, second means for heating the molten metallic silicon in the first means at a first predetermined temperature, third means for injecting silicon dioxide containing material toward the molten metallic silicon accumulated in the first means for causing reaction of the silicon dioxide containing material and the molten metallic silicon for generating gaseous state silicon monoxide, and fourth means, filled with a reducing agent and including heating means for establishing atmosphere of a second predetermined temperature, for receiving the gaseous state silicon monoxide for causing reducing reaction for reducing to metallic silicon which drips into the first means.

According to a still further aspect of the invention, a furnace for manufacturing high-purity metallic silicon comprises hearth section defined at the bottom of the furnace for accumulating molten metallic silicon, first heating means for heating the molten metallic silicon in the hearth section at a first predetermined temperature, silicon dioxide containing material injector nozzle inserted into the furnace through a furnace wall and having an injecting end directed toward the molten metallic silicon in the hearth section and oriented in the vicinity of the upper surface of the molten metallic silicon for injecting silicon dioxide containing material toward the molten metallic silicon in the hearth section for causing reaction of the silicon dioxide containing material and the molten metallic silicon for generating gaseous state silicon monoxide, and reducing section defined in the furnace above the hearth section and filled with a burden of a reducing agent, the reducing section including a second heating means for establishing atmosphere of a second predetermined temperature in the reducing section, and the reducing section receiving the gaseous state silicon monoxide for causing reducing reaction for reducing to metallic silicon which drips into the hearth section.

In the preferred construction, the reducing section is oriented at the position within a path through which the gaseous state silicon monoxide flows, for sucking the silicon monoxide to cause reaction with the reducing agent. This layout of the reducing section does not require any means for forcingly recirculating the gaseous state silicon monoxide.

For achieving satisfactorily high-purity of the metallic silicon to be produced, it is preferred to use a refined natural silica as the silicon dioxide containing material. In the method and apparatus of the invention, the refined natural silica as the silicon dioxide containing material is provided in a form of powder, granular or pellet state of substantially small grain size.

Preferably, the reducing agent is composed of a first carbon containing material and a second silicon containing material. In practice, the carbon containing material includes carbon and/or carbon containing material, such as pitch or other organic compounds and the silicon containing material is composed of silicon carbide and/or silica.

In order to effectively cause reaction for generating gaseous state silicon monoxide, the first heating means controls the temperature of the molten metallic silicon in the first means in a range of 1600° C. to 2300° C. For effectively heating the molten metallic silicon, the first heating means is selected among an arc heating device, a plasma heating device, a induction heating device for heating the molten metallic silicon within the first means at the first predetermined temperature.

On the other hand, in order to effectively perform reducing operation for reducing the silicon monoxide to metallic silicon, the second heating means in the reducing section controls the temperature of atmosphere in a range of 1600° C. to 2400° C. The second heating means may comprise a high-frequency induction heating device or a resistance heating device.

In an alternative embodiment, the hearth section is divided into a first section containing a first part of molten metallic silicon toward which the silicon dioxide containing material is injected, and a second section containing a second part of molten metallic silicon to be taken out as a product. The first and second sections may preferably be communicated with each other so that molten metallic silicon may be transferred therebetween. In this case, the molten metallic silicon dripping from the reducing section is received by the second section of the first means.

In order to facilitate continuous or intermittent operation in manufacturing high-purity metallic silicon, the furnace may also be provided means for continuously or intermittently supplying the reducing agent as the burden in the reducing section.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
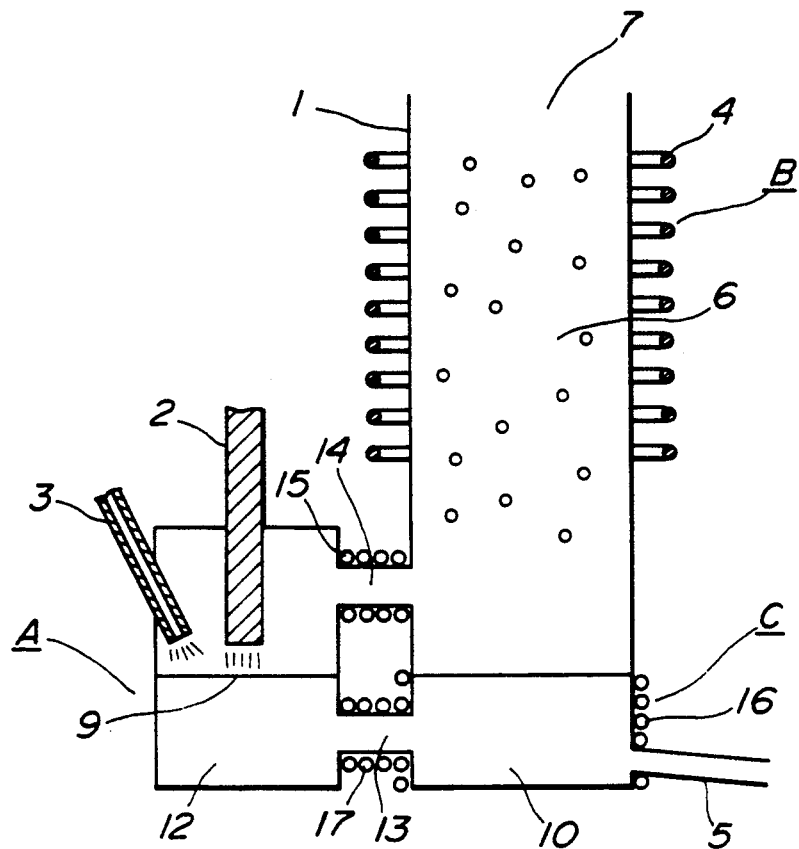
FIG. 1 is a fragmentary section of the preferred embodiment of an apparatus for performing the preferred process of production of high-purity metallic silicon, according to the present invention.

The preferred method or process for producing high-purity metallic silicon according to the present invention includes a step of injecting material silica into molten metallic silicon accumulated in a bottom of a furnace.

When material silica is injected into the molten metallic silicon, silicon monoxide is generated through the reaction of the foregoing formula (5). As seen from the formula (5), carbon monoxide is not produced during the reaction between the molten metallic silicon and the material silica. Therefore, dilution of silicon monoxide thus generated with carbon monoxide will never occur. As a result, much higher than 50% of silicon monoxide can be used for the reaction of the formula (8). Therefore, efficiency in utilizing silicon monoxide can be remarkably improved.

It should be noted that the reaction of the formula (5) is performed in a reaction temperature range higher than or equal to 1600° C. It is more preferable to maintain the reaction temperature in a range higher than or equal to 1850° C. in which the vapor pressure of the silicon monoxide is higher than or equal to 1 atm. However, when the reaction temperature becomes higher than or equal to 2300° C., the vapor pressure of silicon becomes $10^{-2}$ atm or more to increase vaporization loss of silicon. Therefore, the upper limit of the reaction temperature may be set at about 2300° C.

The generated silicon monoxide is reduced to metallic silicon by the reactions of the formulae (7) and (8). The reactions may be stably performed at a reaction temperature range higher than or equal to 1600° C. Therefore, the furnace wall and charge to perform the reactions are to be heated at about the above-mentioned reaction temperature range. An external heating device, such as high-frequency induction heating device, may be used for heating the furnace wall and the charge. It is preferred to maintain the reaction temperature higher than or equal to 2000° C. in which the partial pressure ratio of silicon monoxide versus carbon monoxide is less than or equal to 1.0 in the equilibrium state. However, if the temperature becomes higher than or equal to 2400° C., the vapor pressure of silicon carbide becomes higher than or equal to $10^{-3}$ atm to cause solidification of the vaporized silicon carbide within low temperature region around the top of the furnace. This tends to degrade gas permeability of the furnace. Therefore, it is preferred to set the upper limit of the temperature at 2400° C. to heat the furnace wall and charge.

Referring now to the drawings, the preferred process and apparatus for producing high-purity metallic silicon according to the present invention will be described in detail for facilitating better understanding of the invention. The preferred embodiment of the high-purity metallic silicon producing apparatus is shown in FIG. 1.

In FIG. 1, there is illustrated a sort of shaft furnace 1 serving as a body of the preferred embodiment of a metallic silicon producing apparatus with implementing the preferred process according to the invention. The internal space of the shaft furnace is generally divided into a silicon monoxide generating section A, a reducing agent filled section B and a molten metallic silicon accumulating section C.

The silicon monoxide generating section A includes an injector nozzle 3 for injecting a refined material silica. The material silica to be injected through the injector nozzle 3 is maintained at a temperature in a range of 1600 to 2300° C. The injector nozzle 3 is directed toward a molten metallic silicon accumulating hearth 12 in the silicon monoxide generating section A. In the hearth 12, molten metallic silicon is accumulated. Therefore, as set forth above, the material silica is injected into the molten metallic silicon to induce reaction of the formula (5) to generate silicon monoxide.

Figure 2A:
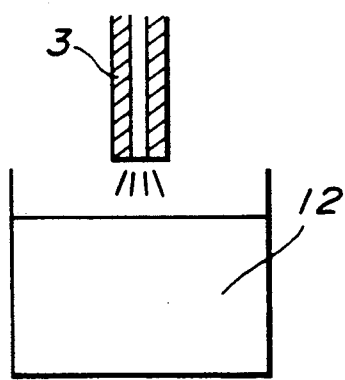
FIGS. 2(a) and 2(b) are illustrations showing manner of injection of material silica.
Figure 2B:
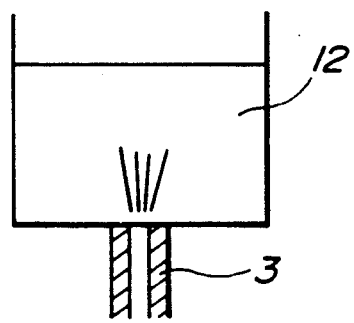

Injection of the material silica into the molten metallic silicon in the hearth 12 in not limited or specified to that illustrated in FIG. 1. For example, it is possible to inject the material silica through the bottom of the hearth 12 as shown in FIG. 2(a). On the other hand, similarly to that illustrated in FIG. 1, the material silica can be injected from the upper side of the hearth 12, as shown in FIG. 2(b). The examples of FIGS. 2(a) and 2(b) to show manner of injections of the material silica should be appreciated as mere examples. Namely, the material silica can be injected into the molten metallic silicon in various manners and thus not limited to the shown examples.

In order to stably perform reaction of the formula (5), it is necessary to heat the molten metallic silicon in the hearth 12 in the temperature range of 1600 to 2300° C. Therefore, in the shown embodiment, an arc electrode 2 is provided in the silicon monoxide generating section A. An arcing current is applied to the arc electrode 2 for arcing. The arcing end of the arc electrode 2 is oriented in the vicinity of the upper surface of the molten metallic silicon in the hearth 12 so that an arcing region 9 is established in the vicinity of the upper surface of the molten metallic silicon for effectively heating the latter.

Though the arc heating device is employed for heating the molten metallic silicon in the hearth 12 in the shown embodiment, it is possible to utilize other heating device, such as plasma heating device, resistance heating device, high-frequency induction heating device and so forth.

The reducing agent filled section B is filled with a reducing agent containing burden 7. The burden 7 contains a reducing agent and silicon containing material. As a reducing agent, carbon, carbon containing material or the combination thereof is used. On the other hand, as the silicon containing material, silicon carbide, silica or the combination thereof is used. The reducing agent filled section B is provided with a high-frequency induction heating coil 4. The high-frequency induction heating coil 4 serves as an external heating device and thus wound around the external periphery of the furnace wall. The high-frequency induction heating coil 4 is designed for heating the furnace wall, internal space, i.e. the reducing agent filled section B and the charge in the section B, in the temperature range of 1600 to 2400° C.

This reducing agent filled section B is communicated with the silicon monoxide generating section A via a communication passage 14. The silicon monoxide generated in the silicon monoxide generating section A is transferred into the reducing agent filled section B via the communication passage 14. The silicon monoxide introduced into the reducing agent filled section B contact with the burden, i.e. the reducing agent and the silicon containing material, to cause reactions of formulae (7) and (8) to produce metallic silicon and silicon carbide.

During the transfer of the silicon monoxide from the silicon monoxide generation section A to the reducing agent filled section B, the solidification of the silicon monoxide tends to occur when the silicon monoxide is cooled in the communication passage 14. In order to avoid this, it is required to sufficiently heat the silicon monoxide in the communication passage 14. Preferably, the silicon monoxide in the communication passage and in the reducing agent filled section B, is maintained at a temperature higher than or equal to 1700° C. For heating the silicon monoxide in the communication passage 14, a heating coil 15 is provided. The heating coil 15 is wound around the external periphery of the communication passage duct for providing the heat for maintaining the temperature of the silicon monoxide passing the communication passage 14. The heating coil 15 is so controlled as to control the temperature of the silicon monoxide in the communication passage 14 at the desired temperature, i.e. higher than or equal to 1700° C.

The metallic silicon produced in the reducing agent filled section B drips into the molten metallic silicon accumulating section C in a hearth 10 of the furnace.

The hearth 10 serving as the molten metallic silicon accumulating section C is communicated with the hearth 12 via a communication passage 13. The hearth 10 is heated by means of a heating coil 16. Similarly, a heating coil 17 is provided for heating the communication passage 13.

With this construction, part of the molten metallic silicon accumulated in the molten metallic silicon accumulating section C is transferred to the silicon monoxide generating section A and to be used for generating silicon monoxide. On the other hand, the molten metallic silicon as a product in the hearth 10 is taken out through a sprue 5.

Figure 3:
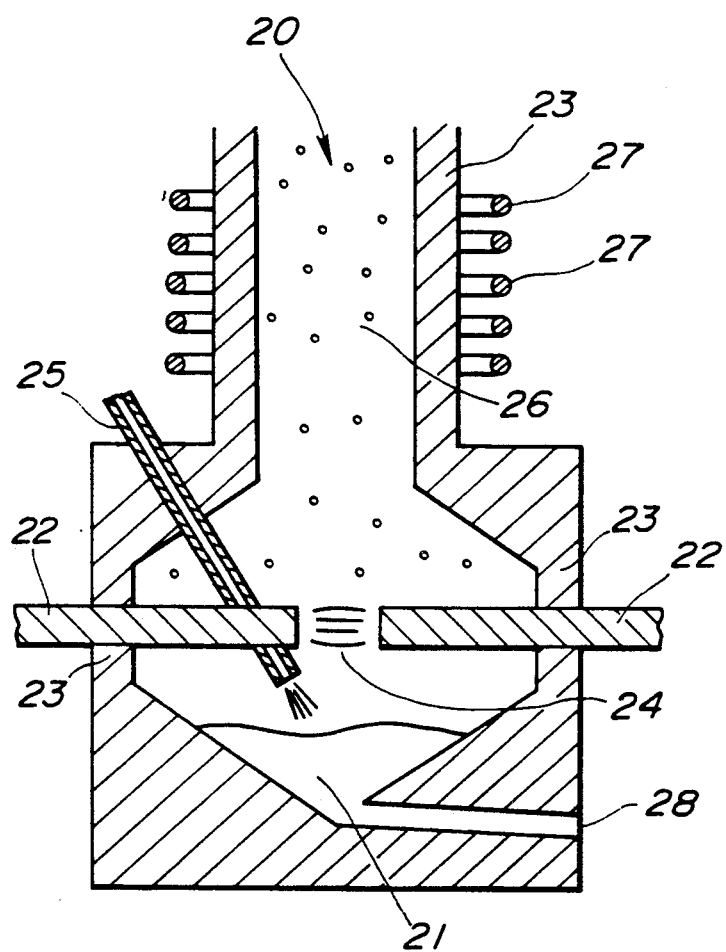
FIG. 3 is a fragmentary section of another embodiment of an apparatus for implementing the preferred high-purity silicon production process according to the invention.

FIG. 3 shows another embodiment of a metallic silicon producing apparatus according to the invention. In this embodiment, the silicon monoxide generating section A and the molten metallic silicon accumulating section C in the former embodiment is formed as a common section in the furnace.

A shaft furnace 20 in the embodiment of FIG. 3, has a hearth 21 in the bottom. The hearth 21 accumulates molten metallic silicon. A pair of arc electrodes 22 is provided above the molten metallic silicon accumulated in the hearth 21. The arc electrodes 22 are inserted through a side wall 23 of the furnace body and extends horizontally. The arc electrodes 22 have the arcing ends forming an arcing region 24 immediately above the molten metallic silicon. The arc electrodes 22 heat the molten metallic silicon at a temperature in the range of 1600 to 2300° C.

In the vicinity of the arc electrodes 22, a material silica injector nozzle 25 is provided for injecting a powder state material silica. The injector nozzle 25 is inserted into the internal space of the furnace through the side wall 23 of the furnace body. The silica injector nozzle 25 extends oblique to the axis of the arc electrodes 22 and has the end directed toward the upper surface of the molten metallic silicon in the hearth 21. The silica injector nozzle 25 injects the material silica in a powder state, granular state, pellet state and so forth, into the molten metallic silicon. By injecting the material silica, silicon monoxide is generated through the reaction of the formula (5).

Above the hearth 21, a reacting agent filled section 26 is formed in the furnace. The reacting agent filled section 26 is filled with the reacting agent containing burden including the reducing agent, i.e. carbon and/or carbon containing material. The burden in the reacting agent filled section 26 is maintained at a temperature in the range of 1600 to 2400° C. by means of a high-frequency induction heating coil 27.

In the reducing agent filled section 26, the silicon monoxide generated through the reaction of the injected material silica and the molten metallic silicon in the hearth, contact with the burden. As a result, the reactions of formulae (7) and (8) is induced for generating metallic silicon and silicon carbide. The generated metallic silicon drips into the hearth 21 to be accumulated therein.

The metallic silicon thus accumulated in the hearth 21 is taken out through a sprue 28 of the furnace.

As will be appreciated, in both embodiments set forth above, it is not necessary to perform pre-treatment of the material silica which is provided in a form of small grain powder, granular or pellet state for forming sufficient grain size silica block and thus a powder state, granular state or pellet state material silica can be used. Furthermore, since the apparatus of the shown embodiments do not require recirculation of the silicon monoxide for obtaining high yield.

The effect of the apparatus of FIG. 1 was checked through experiments utilizing a small arc furnace (100 kW). The result of experiments performed in the conventional process and the inventive process is shown in the appended table. As will be seen from the table, the inventive process exhibits substantially the same yield to that obtained in the conventional process which recirculates the silicon monoxide. On the other hand, as will be appreciated from the table, the metallic silicon production efficiency versus electric power consumed can be reduced to a magnitude of 16 kW/kg-Si in the inventive process.

It should be noted that the reducing agent to be utilized in the preferred process is consisted of carbon and/or carbon containing material, and silicon carbide and/or silica. In case that the reducing agent is highly purified and thus provided in a powder state, it is preferable to perform treatment for forming relatively large grain size blocks utilizing binding material, such as sugar, phenol resin, starch and so forth. Greater grain size blocks of reducing agent may provide sufficient gas permeability of the reducing agent filled section in the furnace.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

TABLE

| | Invention | Conventional Dust Recovered | Conventional Dust Not Recovered |
|---|---|---|---|
| SiO Injection Amount (kg/hour) | 7 | 7 | 7 |
| Si Recovery Yield (%) | 99 | 99 | 90 |
| Electric Power Consumption (kW/kg-Si) | 16 | 20 | 25 |

We claim:

1. A process for producing (a) high-purity metallic silicon suitable for a solar cell comprising the steps of:
   injecting a silicon dioxide containing material toward molten metallic silicon for causing a reaction to generate gaseous silicon monoxide, said reaction occurring at a first temperature between 1600° C. and 2300° C.;
   contacting generated gaseous silicon monoxide with a reducing agent which is composed of a carbon containing material selected from the group consisting of carbon and carbon containing materials such as pitch or other organic compounds, and a silicon containing material selected from the group consisting of silicon carbide and silica, for reducing said silicon monoxide to obtain metallic silicon, said reduction occurring at a second temperature between 1600° C. and 2400° C.; and
   collecting metallic silicon obtained from said silicon monoxide.

2. A process as set forth in claim 1, in which, in the step of injecting said silicon dioxide containing material, said silicon dioxide containing material is injected in a fluid state into a molten metallic silicon which is collected through said metallic silicon collecting step.

3. A process as set forth in claim 2, in which said silicon dioxide containing material injecting step is performed by injecting powder state silica.

4. A process as set forth in claim 1, in which said silicon dioxide containing material injecting step occurs at a first temperature between 1850° C. and 2300° C.

5. A process as set forth in claim 1, in which said step of contacting said silicon monoxide to said reducing agent is performed by introducing said gaseous silicon monoxide into a layer of said reducing agent.

6. A process as set forth in claim 1, in which said step of contacting said silicon monoxide to said reducing agent is performed at said second temperature.

7. A process for producing high-purity metallic silicon suitable for a solar cell comprising the steps of:
   defining first and second sections in a shaft furnace, the first section being configured at a lower portion therein in relation to said second section and adapted to accumulate said metallic silicon in a molten state said second section being filled with a reducing agent containing a carbon containing material selected from the group consisting of carbon and carbon containing material such as pitch or other organic compounds, and a silicon containing material selected from the group consisting of silicon carbide and silica;
   establishing a first temperature in said first section between 1600° C. to 2300° C.;
   establishing a second temperature in said second section between 1600° C. to 2400° C.;
   injecting silicon dioxide containing material into said first section for causing a reaction between said silicon dioxide and said molten metallic silicon to generate gaseous silicon monoxide;
   introducing said gaseous silicon monoxide into said second section for contacting said gaseous silicon monoxide with said reducing agent for reducing said silicon monoxide to obtain metallic silicon; and
   collecting said obtained metallic silicon in said first section.

8. A process as set forth in claim 7, wherein said first temperature in said first section is established by means of a heating device that heats said molten metallic silicon in said first section.

9. A process as set forth in claim 8, wherein said first temperature in said first section is established by means of an arc heating device.

10. A process as set forth in claim 8, wherein said first temperature in said first section is established by means of a plasma heating device.

11. A process as set forth in claim 8, wherein said first temperature in said first section is established by means of a resistance heating device.

12. A process as set forth in claim 8, wherein said first temperature in said first section is established by means of a high-frequency induction heating device.

13. A process as set forth in claim 7, wherein said first temperature in said first section is established for controlling the temperature of said molten metallic silicon in said first section in a range between 1850 and 2300° C.

14. A process as set forth in claim 7, wherein said second temperature in said second section is established by means of a heating device.

15. A process as set forth in claim 14, wherein said second temperature in said second section is established by means of a high-frequency induction heating device.

16. A process as set forth in claim 14, wherein said second temperature in said second section is established by means of a resistance heating device.

17. A process as set forth in claim 7, wherein said second temperature in said second section is established for controlling the temperature of said molten metallic silicon in said second section in a range of 2000° C. and 2400° C.

18. A process as set forth in claim 7, in which said step of introducing said gaseous state silicon monoxide into said second section and contacting said silicon monoxide to said reducing agent is performed by introducing said silicon monoxide into a layer of reducing agent in said second section, said reducing agent being composed of a carbon containing material which contains carbon, carbon containing material or the mixture thereof, and a silicon containing material containing silicon carbide, silica or the mixture thereof.

* * * * *

UNITED STATES PATENT AND TRADEMARK OFFICE
CERTIFICATE OF CORRECTION

PATENT NO. : 5,104,633
DATED : April 14, 1992
INVENTOR(S) : Yasuhiko Sakaguchi et al It is certified that error appears in the above-identified patent and that said Letters Patent is hereby corrected as shown below:

On the title page please insert the following:

--[73] Assignees: Kawasaki Steel Corporation, Hyogo, Japan
and Nippon Sheet Glass Co., Osaka, Japan--.

Signed and Sealed this

Fourteenth Day of July, 1992

Attest:

DOUGLAS B. COMER

Attesting Officer     Acting Commissioner of Patents and Trademarks